(12) United States Patent
Suzuki

(10) Patent No.: US 9,672,539 B2
(45) Date of Patent: Jun. 6, 2017

(54) ADVERTISEMENT GENERATION APPARATUS AND TERMINAL DEVICE

(71) Applicant: YAHOO JAPAN CORPORATION, Tokyo (JP)

(72) Inventor: Natsume Suzuki, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 408 days.

(21) Appl. No.: 14/209,281

(22) Filed: Mar. 13, 2014

(65) Prior Publication Data

US 2014/0289058 A1    Sep. 25, 2014

(30) Foreign Application Priority Data

Mar. 22, 2013 (JP) .................. 2013-060945

(51) Int. Cl.
*G06Q 30/00* (2012.01)
*G06Q 30/02* (2012.01)
*G09G 5/14* (2006.01)

(52) U.S. Cl.
CPC ........... *G06Q 30/0277* (2013.01); *G09G 5/14* (2013.01)

(58) Field of Classification Search
CPC .................................................. G06Q 30/0277
See application file for complete search history.

(56) References Cited

U.S. PATENT DOCUMENTS

| | | | | |
|---|---|---|---|---|
| 7,941,525 B1* | 5/2011 | Yavilevich | ............. | H04L 67/22 709/203 |
| 2002/0156679 A1* | 10/2002 | Castle | .................... | G06Q 30/02 705/14.73 |
| 2007/0094081 A1* | 4/2007 | Yruski | ................... | G06Q 30/02 705/14.66 |
| 2008/0127264 A1* | 5/2008 | Klosterman | ........ | G06F 3/04842 725/42 |
| 2010/0198697 A1* | 8/2010 | Brown | ................... | G06Q 30/02 705/14.73 |

FOREIGN PATENT DOCUMENTS

| | | |
|---|---|---|
| EP | 2 317 424 A1 | 5/2011 |
| JP | 2011-103073 A | 5/2011 |
| JP | A-2011-103073 | 5/2011 |
| JP | A-2012-73863 | 4/2012 |
| WO | WO 2011/024535 A1 | 3/2011 |

OTHER PUBLICATIONS

Jul. 1, 2014 Office Action issued in Japanese Application No. 2013-060945 (with translation).
Jun. 2, 2015 Japanese Office Action issued in Japanese Patent Application No. 2014-212044.

* cited by examiner

*Primary Examiner* — Bennett Sigmond
*Assistant Examiner* — Scott C Anderson
(74) *Attorney, Agent, or Firm* — Oliff PLC

(57) ABSTRACT

An advertisement generation apparatus includes a generating unit that generates a page to be displayed on a terminal device that displays an advertisement on a screen. The page includes a content page and an advertising page that are superimposed one on top of the other, where the content page includes an advertising space such that the advertising space is to be scrolled on the screen according to operation, and the advertising page is greater in size than the advertising space. The page is configured to display the content page, and a part of the advertising page located within the advertising space.

8 Claims, 9 Drawing Sheets

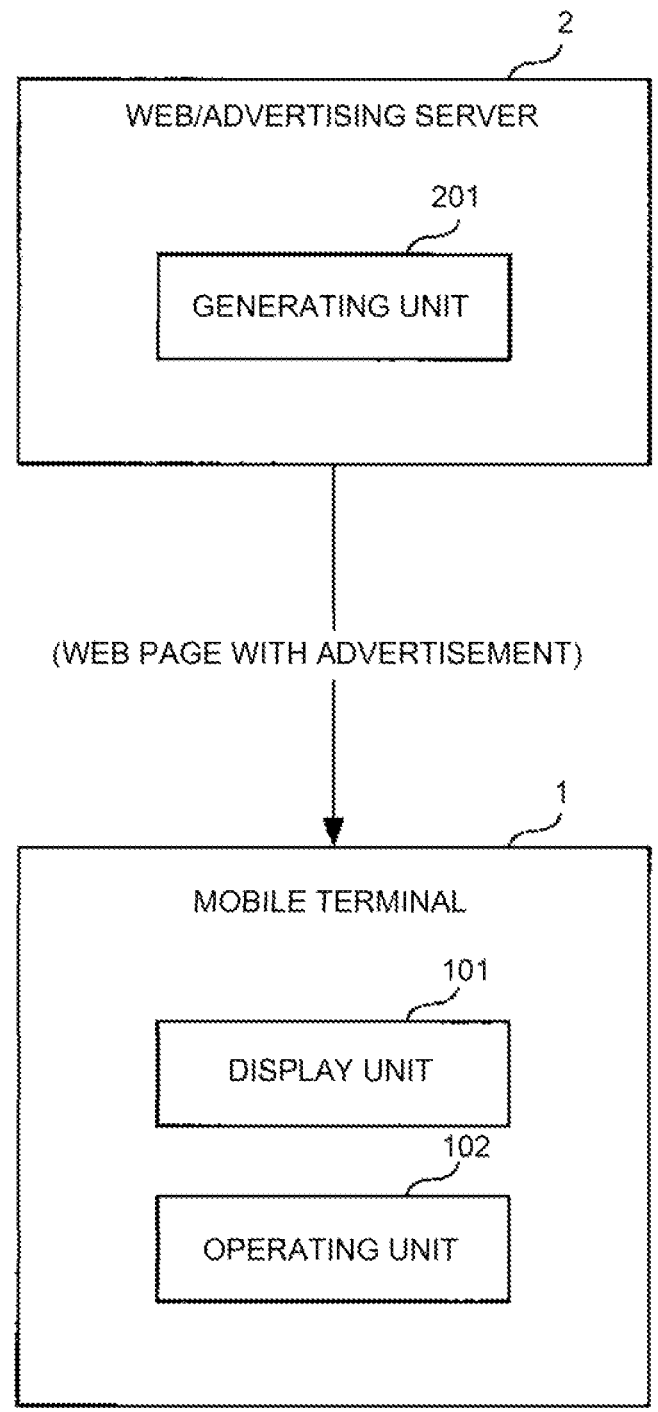

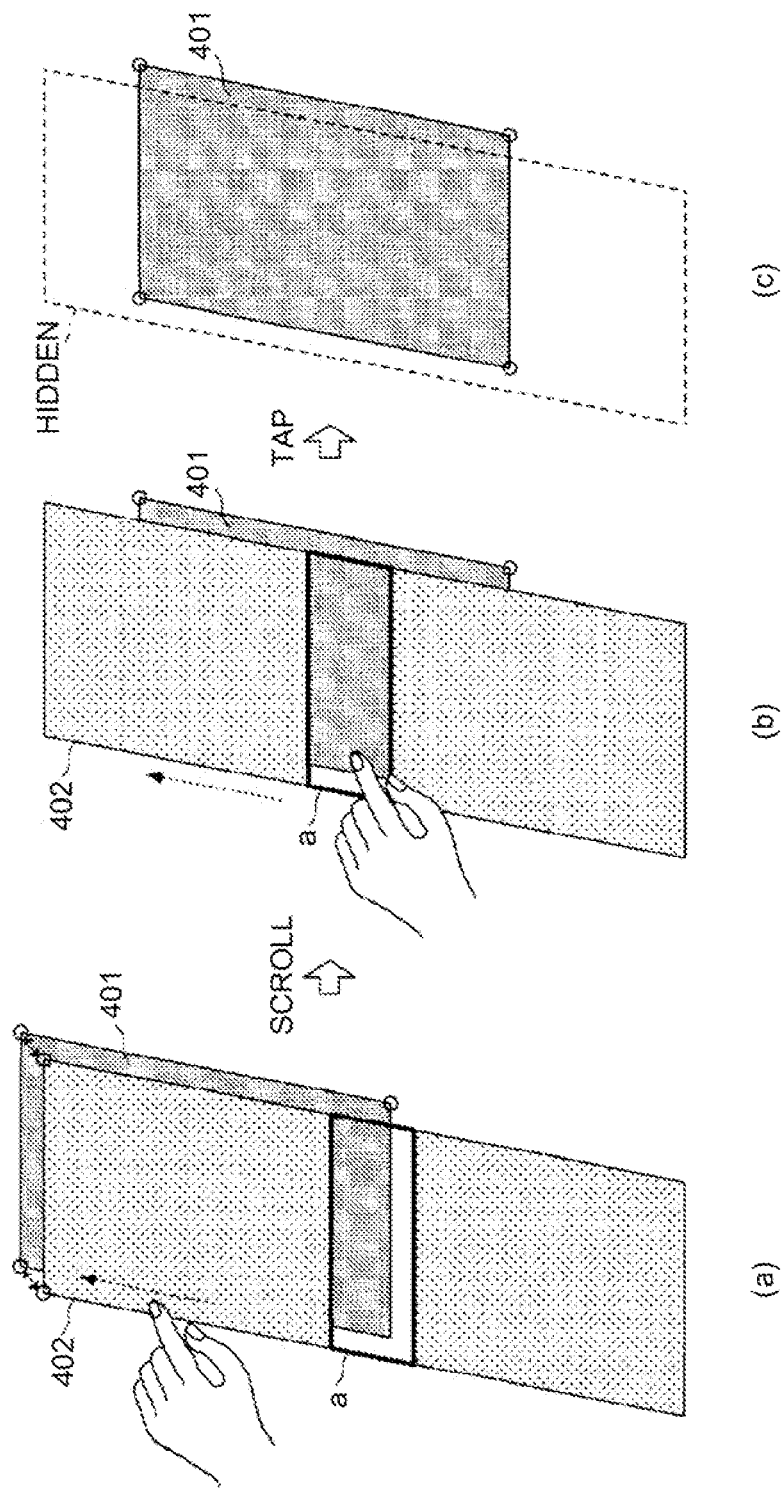

FIG.7

```
<!DOCTYPE html>
<html lang="ja">
  <head>
    <meta charset="utf-8">
    <title id="title="">WEB PAGE WITH ADVERTISEMENT</title>
    <meta name="viewport" content="width=device-width,initial-scale=1.0,minimum-scale=1.0,maximum-scale=1.0,user-scalable=0">
    <style>
      html,
      body {
        width: 100%;
        height: 100%;
        margin: 0;
        padding: 0;
      }

/*DESCRIPTIONS OF CONTENT PAGE
       *ABSOLUTE INITIAL POSITIONING WITH TOP 0
        AND LEFT 0 OF body TAKEN AS STARTING POINT, WIDTH OF 100% */
      #main {
        position: absolute;
        top: 0;
        left: 0;
        width: 100%;
      }

/*TEXT FOR "CONTENT" */
      .content {
        padding: 50% 0;
        background-color: #eee;
        text-align: center;
      }

/*DESCRIPTIONS OF ADVERTISING PAGE */
       *FIXED POSITIONING WITH TOP 0 AND LEFT 0 OF body TAKEN AS
        STARTING POINT, WIDTH OF 100%, VERTICAL WIDTH OF 100%
       *APPLY IMAGE (beer.jpg) AS ADVERTISING PAGE */
      #newad-body {
        position: fixed;
        top: 0;
        left: 0;
        width: 100%;
        height: 100%;
        background: no-repeat url(beer.jpg) 50% 0 #fff;
        text-align: center;
      }

/*DESCRIPTIONS OF TRANSPARENT ADVERTISING AREA */
      #newad {
        display: block;
        height: 120px;
      }
    </style>
  </head>
```

701 — (content page block)
702 — (advertising page block)
703 — (transparent advertising area block)

FIG.9

```
<script type="text/javascript"src"="http://i.yimg.jp/images/commerce/js/libs/jquery/core/1.7.1/
jquery.min.js"></script>
  <script type="text/javascript">
    (function 0 {

//PROCESS PERFORMED WHEN ADVERTISING AREA IS PRESSED
    $('#newad').bind('click', function () {
      $('#main').css('visibility', 'hidden'); // HIDE CONTENT PAGE
           //FORBID SCROLL IN FULL SCREEN (ONLY FOR SMARTPHONE)
      $(document).bind('touchmove', function (e) {
        e.preventDefault();
      }),
    });

}());
  </script>

</html>
```

}901

ADVERTISEMENT GENERATION APPARATUS AND TERMINAL DEVICE

CROSS-REFERENCE TO RELATED APPLICATIONS

The present application claims priority to and incorporates by reference the entire contents of Japanese Patent Application No. 2013-060945 filed in Japan on Mar. 22, 2013.

BACKGROUND OF THE INVENTION

1. Field of the Invention

The present invention relates to an advertisement generation apparatus and a terminal device.

2. Description of the Related Art

Conventionally, banner advertising is known as advertising on Web pages (Web sites). In recent years, mobile terminals as represented by smartphones are becoming widely used. Therefore, more and more users are browsing Web pages on mobile terminals.

Incidentally, screens of the user's mobile terminals are smaller than screens of personal computers (PCs) or the like; therefore, it is difficult to place an advertisement on a mobile Web page.

As a related technique, for example, there is a proposed technique to modify an advertisement to reduce the size of the advertisement for display on the Web page, or to change a display position of the advertisement depending on the state of the Web page when displaying the advertisement (see, for example Japanese Patent Application Laid-open do. 2012-073863).

However, when an advertisement is to foe placed on a mobile Web page, in most cases, the size of the advertisement to be submitted is limited because an advertising space needs to be reduced. Therefore, it becomes difficult for advertisers to submit advertisements with greater sizes. Furthermore, in the case of advertisements with smaller sizes, users may feel difficulty in, for example, browsing the advertisements or performing tap operation on the advertisements, so that it becomes difficult to achieve high advertising effectiveness (for example, high click: through rate (CTR)).

SUMMARY OF THE INVENTION

It is an object of the present invention to at least partially solve the problems in the conventional technology.

According to an aspect of an embodiment, an advertisement, generation, apparatus generates an advertisement, and the advertisement generation apparatus includes a generating unit that generates a page to be displayed on a terminal device that displays an advertisement on a screen, wherein the page includes a content page and an advertising page that are superimposed one on top of the other, the content page including an advertising space such that the advertising space is to be scrolled on the screen according to operation, and the advertising page being greater in size than the advertising space, and the page is configured to display the content page, and a part of the advertising page located within the advertising space.

According to another aspect of an embodiment, a terminal device displays an advertisement on a screen, and the terminal device includes a display unit that displays a page including a content page and an advertising page that are superimposed one on top of the other, the content page including an advertising space such that the advertising space is to be scrolled on the screen according to operation, and the advertising page being greater in size than the advertising space, wherein the display unit displays the content page, and a part of the advertising page located within the advertising space.

The above and other objects, features, advantages and technical and industrial significance of this invention will foe better understood by reading the following detailed description of presently preferred embodiments of the invention, when considered in connection with the accompanying drawings.

BRIEF DESCRIPTION OF THE DRAWINGS

FIG. 3 is a diagram illustrating a software configuration example of the mobile terminal and the Web/advertising server;

FIG. 5 is a diagram illustrating an example of generation of a Web page with advertisement;

FIG. 7 is a diagram illustrating a first example of an HTML file of the Web page with advertisement;

FIG. 9 is a diagram illustrating a third example of the HTML file of the Web page with advertisement.

DETAILED DESCRIPTION OF THE PREFERRED EMBODIMENTS

Exemplary embodiments of the present invention will be explained below.

Configuration

Network Configuration

Figure 1:
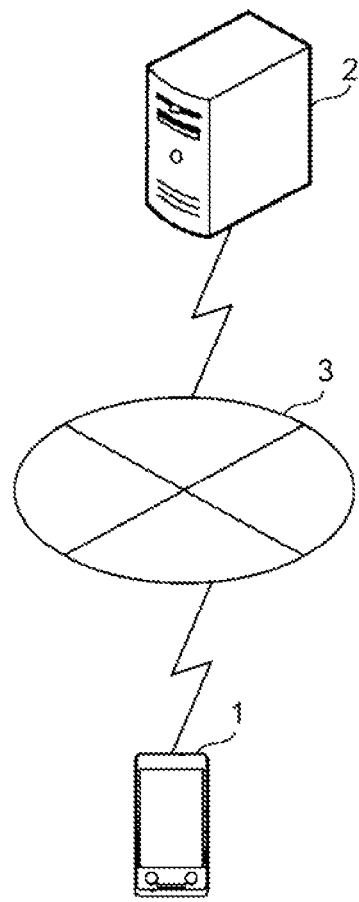
FIG. 1 is a network configuration diagram of an advertising system.

FIG. 1 is a network configuration diagram of an advertising system according to an embodiment of the present invention. In the advertising system, a mobile terminal 1 and a Web/advertising server 2 are connected to each other via a network 3.

The mobile terminal 1 is a user's mobile terminal for browsing a mobile Web page. A user accesses a Web page with advertisement by using the mobile terminal 1 and views information, or an advertisement in the Web page.

The mobile terminal 1 includes, for example, a smartphone, a tablet computer, or the like. Furthermore, the mobile terminal 1 includes an application, such as a Web browser, to browse the Web page with advertisement.

The Web/advertising server 2 is an advertisement generation apparatus that generates a Web page with advertisement for the mobile terminal 1 and provides the Web page with advertisement to the mobile terminal 1. In the embodiment, the Web/advertising server 2 functions both as a Web server and an advertising server. When receiving a request to browse a Web page (Web site) from the mobile terminal 1, the Web/advertising server 2 places an advertisement submitted by an advertiser on a Web page to generate a Web page with advertisement, and returns the generated Web page with advertisement. Therefore, the Web page with advertisement can be browsed by the mobile terminal 1. Incidentally, it is of course possible to configure the Web server and the advertisement server as separate devices.

The network 3 includes wired and wireless networks. For example, the network 3 is an Internet, network for connecting the mobile terminal 1 and the Web/advertising server 2. Furthermore, the mobile terminal 1 and the Internet are connected via a third generation network (3G), a fourth generation network (4G), WiFi (registered trademark), or the like.

Hardware Configuration

Figure 2:
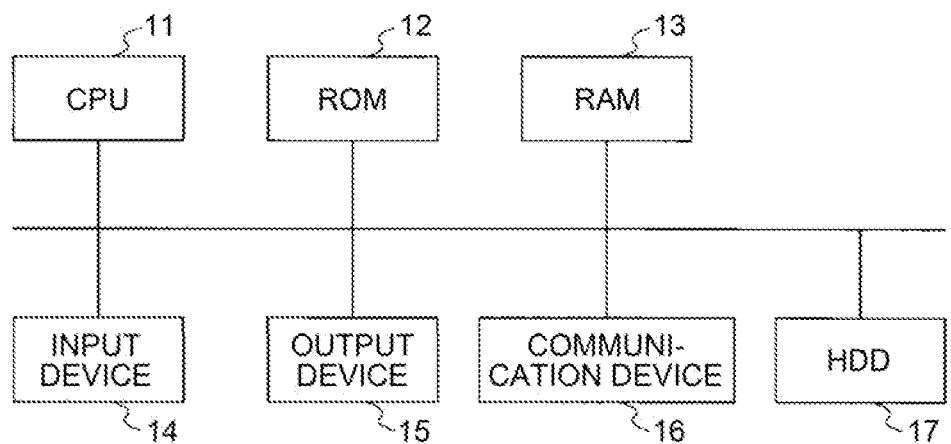
FIG. 2 is a diagram illustrating a hardware configuration example of a mobile terminal and a Web/advertising server.

FIG. 2 is a diagram illustrating a hardware configuration example of the mobile terminal 1 and the Web/advertising server 2 according to an embodiment of the present invention. Specifically, as illustrated in FIG. 2, each of the mobile terminal 1 and the Web/advertising server 2 includes a central processing unit (CPU) 11, a read only memory (ROM) 12, a random, access memory (RAM) 13, an input device 14, an output device 15, a communication device 16, and a hard disk drive (HDD) 17.

The CPU 11 executes various programs and arithmetic processing. The ROM 12 stores therein programs needed for activation. The RAM 13 temporarily stores therein processes performed by the CPU 11, data, or the like. The input device 14 is a keyboard or a mouse (including a touch panel). The output device 15 is a display that outputs and displays videos or images, or a speaker that outputs audio or the like. The communication device 16 performs communication with other devices via the network 3. The HDD 17 stores therein various types of data and programs.

Software Configuration

FIG. 3 is a diagram illustrating a software configuration example of the mobile terminal 1 and the Web/advertising server 2 according to an embodiment of the present invention.

The Web/advertising server 2 includes, as a functional unit, a generating unit 201.

When receiving a request to browse a Web page from the mobile terminal 1, the generating unit 201 places an advertisement submitted by an advertiser on the Web page to generate a Web page with advertisement. Furthermore, the generating unit 201 returns the generated Web page with advertisement.

Incidentally, the generating unit 201 generates the Web page with advertisement by superimposing a content page, which includes an advertising space in a part thereof such that the advertising space can be scrolled on a screen according to operation, with an advertising page that is greater in size than the advertising space. A detailed example of the Web page with advertisement will be described later.

The mobile terminal 1 includes, as functional units, a display unit 101 and an operating unit 102.

The display unit 101 has a function to display the Web page with advertisement. A detailed example of the Web page with advertisement will be described later.

The operating unit 102 has a function, to detect and perform screen scroll operation on the Web page with advertisement or other operation (for example, tap operation) on the advertisement, in accordance with user's operation. Incidentally, when the screen scroll operation is detected, for example, the Web page with advertisement is scrolled up, down, left, or right. Furthermore, when operation on the advertisement is detected, for example, the advertisement is switched to a full-screen advertisement, or the screen is changed to a screen identified by a URL limbed to the advertisement.

Examples of Advertisements

An example of the Web page with advertisement according to an embodiment will be described below. The Web page with advertisement described below is generated by the Web/advertising server 2 (the generating unit 201) and transmitted to the mobile terminal 1.

Components of the Web Page with Advertisement

Figure 4A:
FIGS. 4A and 4B illustrate components of a Web page with advertisement.
Figure 4B:
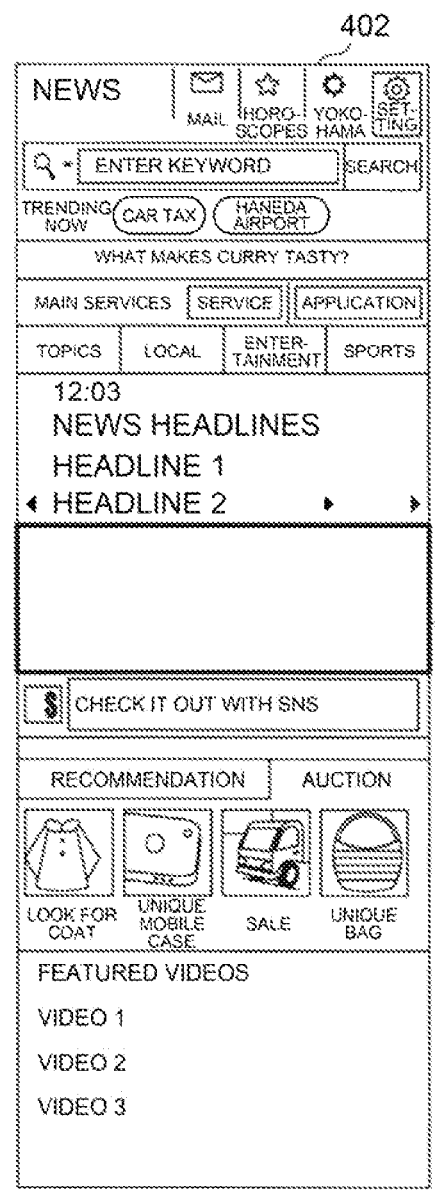

FIGS. 4A and 4B illustrate components of the Web page with advertisement according to an embodiment of the present invention. The Web page with advertisement includes, as page components, an advertising page 401 and a content page 402.

The advertising page 401 is advertisement data submitted by an advertiser. The advertisement data may be image data (an image of the advertisement), video data (video advertising), text (text advertising), or the like.

The content page 402 is a content of the Web page. The content page 402 illustrated in FIG. 4B is an example of a top page of a portal site. The content volume of the content page 402 is set such that the vertical size (length) of the content page 402 is longer than a single screen of the mobile terminal 1. Namely, when a user browses ail of the content, he/she needs to scroll up the screen by flicking or the like.

Furthermore, the content page 402 includes an advertising space "a" placed in a predetermined position in a part of the page as illustrated in FIG. 4B. The advertising space "a" is placed by description definitions of the content page 402.

The shape of the advertising space "a" is a rectangle. As the size of the advertising space "a", the horizontal width is the same as the content page 402 and the vertical width is about one-third to one-fifth of the single screen of the mobile terminal. The color attribute of the advertising space "a" is a transparent color. Incidentally, the advertising space "a" may be formed in a circular (elliptical) or polygonal shape, instead of a rectangular shape. Furthermore, the color attribute of the advertising space "a" may be a chromatic color as long as it is a transparent color.

A link to the advertising page 401 is embedded in the advertising space "a". Specifically, when a user performs operation (for example, tap operation) on the advertising space "a", the advertising page 401 is displayed on the front of the screen of the mobile terminal 1.

Generation of the Web Page with Advertisement

FIG. 5 is a diagram illustrating an example of generation of the Web page with advertisement according to the embodiment of the present invention. As described above, the Web page with advertisement includes, as the page components, the advertising page 401 and the content page 402.

First, as illustrated in portion (a) of FIG. 5, the Web page with advertisement is generated by superimposing the two components one on top of the other such that the content page 402 is placed on the front (top surface) and the advertising page 401 is placed on the back (back surface) of the screen of the mobile terminal 1.

Four corners of the advertising page 401 are fixed, to prevent the advertising page 401 from being scrolled on the screen of the mobile terminal 1. In contrast, the vertical, size (length) of the content page 402 is longer than the single screen of the mobile terminal 1; therefore, the content page 402 is enabled to be scrolled on the screen to allow the user to browse all of the content. However, in the initial screen, the advertising page 401 and the content page 402 are superimposed seen that two points, i.e., right upper corners and left upper corners, coincide with each another.

By generating the Web page with advertisement as described above, if the content page 402 is scrolled on the screen of the mobile terminal 1 as illustrated in portion (b) of FIG. 5, the advertising space "a" placed in a predetermined position in a part of the content page 402 is also moved upward for example, along with the scrolling.

In this case, because the advertising space "a" is in the transparent color, the advertising page 401 superimposed on the back (back surface) is displayed on the screen of the mobile terminal 1 through the advertising space "a". Namely, the user can view a part of the advertising page 401 in the frame of the advertising space "a". Incidentally, the advertising page 401 is not scrolled on the screen of the mobile terminal 1. The user can eventually view the entire advertising page 401 from the lower part to the upper part along with, for example, upward movement of the advertising space "a".

Furthermore, the link to the advertising page 401 is embedded in the advertising space "a". Therefore, if the user performs operation (for example, tap operation) on the advertising space "a", the content page 402 is hidden and the advertising page 401 is displayed on the front of the screen of the mobile terminal 1 as illustrated in portion (c) of FIG. 5.

Examples of a Screen of the Web Page with Advertisement

FIGS. 6A to 6D are diagrams illustrating examples of a screen of the Web page with advertisement according to an embodiment of the present invention.

Figure 6A:
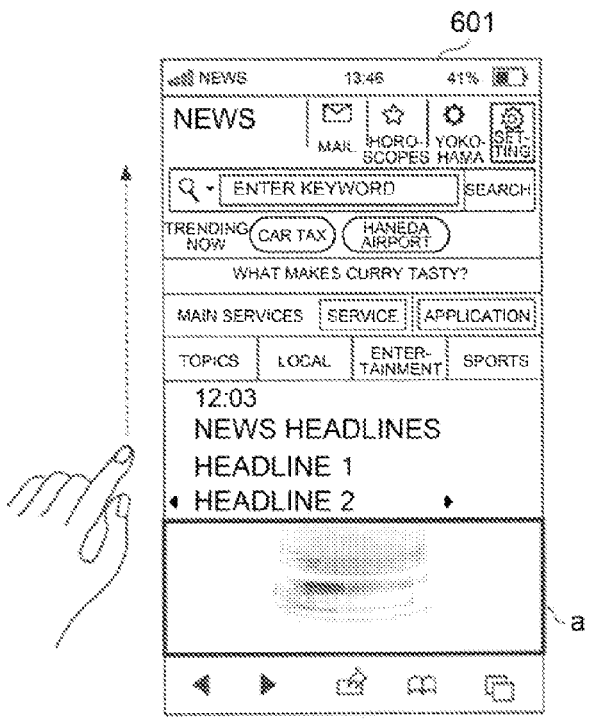
FIGS. 6A to 6D are diagrams illustrating examples of a screen of the Web page with advertisement.

A screen 601 is an initial screen of the Web page with advertisement on the mobile terminal 1. First, as illustrated in FIG. 6A, a user displays the Web page with advertisement on a Web browser of the mobile terminal 1. The advertising space "a" is displayed in a lower portion of the screen 601. Furthermore, a part of the advertising page 401 is displayed through the advertising space "a".

Figure 6B:

Subsequently, as illustrated in FIG. 6B, the user scrolls the screen 601 by flicking, which is operation to slide a finger while touching a touch screen with the finger. In this case, for example, the advertising space "a" is moved to the middle of the screen and another part (which is different from the part in FIG. 6A) of the advertising page 401 is displayed through the advertising space "a".

Figure 6C:
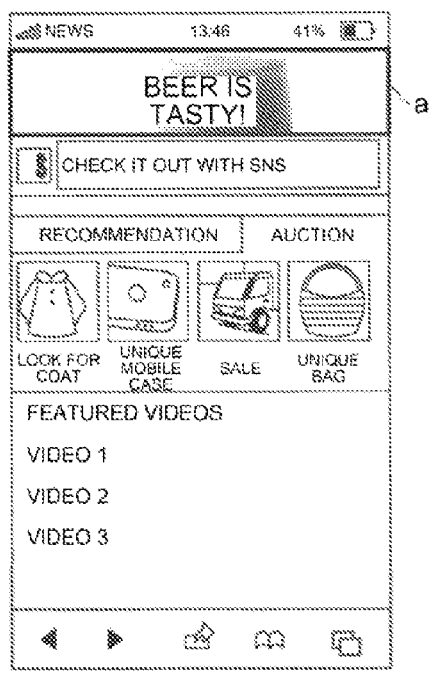

Then, as illustrated in FIG. 6C, the user further scrolls the screen 601. In this case, for example, the advertising space "a" is moved to the upper portion of the screen, and another part (which is different from the parts in FIGS. 6A and 6B) of the advertising page 401 is displayed through the advertising space "a".

As described above, the user can view the parts of the advertising page 401 from the lower part to the upper part in the frame of the advertising space "a" while scrolling the screen 601, so that he/she can eventually view the entire advertising page 401.

Figure 6D:
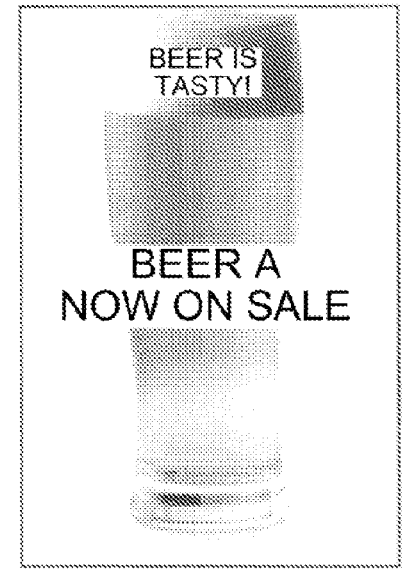

Furthermore, if the user performs operation (for example, tap operation) on the advertising space "a", the advertising page 401 is displayed on the front of the screen of the mobile terminal 1 as illustrated in FIG. 6D. Namely, the advertising page 401 is displayed as a full-screen screen advertisement on the screen of the mobile terminal 1.

Examples of an HTML File of the Web Page with Advertisement

As described above, the Web page with advertisement includes the advertising page 401 and the content page 402 as the page components, and the two components are superimposed one on top of the other so that the content page 402 is placed on the front (top surface) and the advertising page 401 is placed on the back (back surface) such that the advertising page 401 can be displayed, on the front of the screen of the mobile terminal 1.

The Web page with advertisement as described above can be implemented by a single HTML file in reality. Therefore, the mobile terminal 1 can implement the Web page with advertisement according to an embodiment by displaying the single HTML file on a Web browser or the like.

Figure 8:
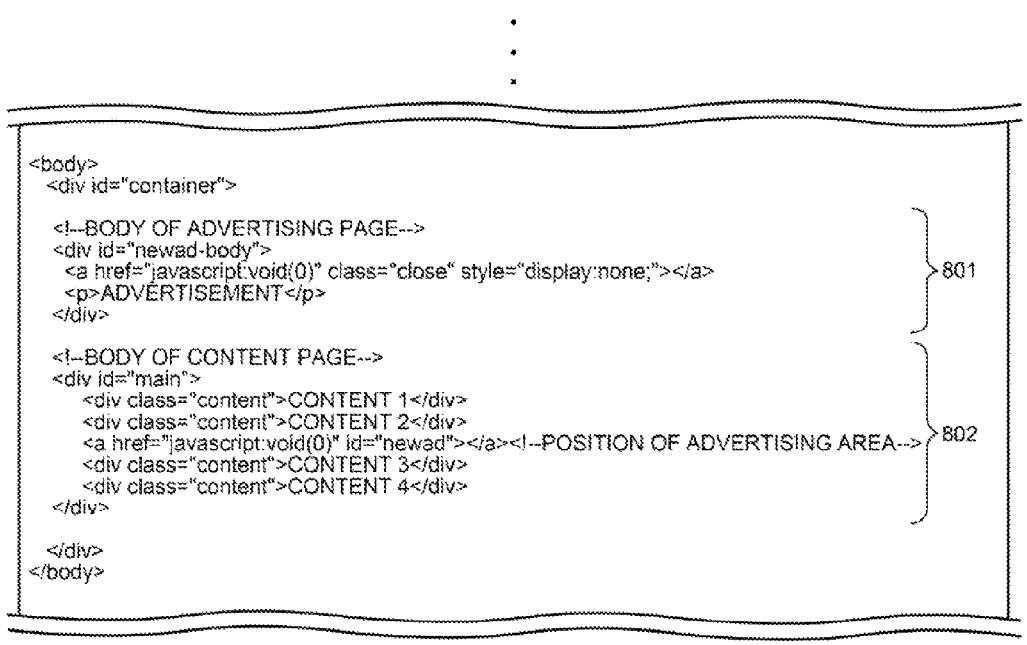
FIG. 8 is a diagram illustrating a second example of the HTML file of the Web page with advertising.

FIGS. 7 to 9 illustrate an example of an HTML file of the Web page with advertisement according to an embodiment of the present invention. FIGS. 7 to 9 illustrate three divided parts of a single HTML file for the sake of illustration in the drawings. Each of descriptions will be explained below.

FIG. 7 illustrates descriptions in a <style> tag.

701 denotes descriptions of positioning of the content page on the screen. The content page is arranged by absolute initial positioning with a top margin of 0 and a left margin of 0 with respect, to a body (i.e., at the coordinate (0, 0)). The width is designated as 100% of the width of the screen.

702 denotes descriptions of positioning of the advertising page on the screen. The advertising page is arranged by absolute fixed positioning with a top margin of 0 and a left margin of 0 with respect to a body (i.e., at the coordinate (0, 0)). The width is designated as 100% of the width of the screen, and the height is designated as 100% of the height of the screen. Namely, the advertising page is arranged as a full-screen advertisement with the same size as the screen.

703 denotes descriptions of definitions of the transparent advertising space. The vertical width is designated as 120 pixels (px).

FIG. 8 illustrates descriptions in a <body> tag.

801 denotes descriptions of a body of the advertising page. In this example, "newad-body" (an image of the advertisement (beer.jpg)) in the <style> tag is called by using "id=newad-body" as a key. Incidentally, because the advertising page is HTML, it is possible to, in the descriptions 801, write the content of the advertisement as text or call a moving image in addition to the image of the advertisement. Furthermore, it may be possible to additionally designate a link to a site of the advertiser in the advertising page (the image of the advertisement, the content of the advertisement, the moving image, or the like). In this configuration, when operation (for example, tap operation) is farther performed on the advertising page (see, for example, FIG. 6D), the screen may foe switched to the site of the advertiser.

802 denotes descriptions of a body of the content page. In this example, detailed content (for example, news articles or the like) of the Web page are written. Furthermore, "newad" (the advertising space) in the <style> tag is called by using "id=newad" as a key.

FIG. 9 illustrates descriptions in a <script> tag.

901 denotes descriptions of a process to be performed when the advertising space is pressed (for example, tapped). In this example, it is defined that the content page is hidden when the advertising space is pressed. Namely, the advertising page on the back is displayed as a full-screen advertisement by hiding the content page.

Application Example

The Web page with advertisement may be configured such that when the advertising space "a" is operated, information indicating the position of the advertising space "a" in the context page on the screen (scrolled position) or the tapped position on the screen (coordinate of the screen) at this time is transmitted to the Web/advertising server 2, and the Web/advertising server 2 accumulates the information as a log. By analyzing the log, it becomes possible to identify which part of the advertising page has been displayed when the user operates the advertising space "a" based on the position of the advertising space "a" on the screen, and the results can be accumulated. Thus, because it is possible to know which part of the advertising page has been displayed when the user operation is induced, it becomes possible to use the results to generate advertising pages afterward (for example, it may be better to place a catch phrase in a lower portion of the advertising page).

Furthermore, as for a billing method by the advertiser, the Web page with advertisement may be configured to cause the Web/advertising server 2 to be accessed when the advertising space "a" is operated, and thereafter, when the full-screen advertisement is operated, and cause the Web/advertising server 2 to accumulate an access log. The Web/advertising server 2 may be configured to employ a two-step billing method so as to charge a first fee when the advertising space "a" is operated and charge a second fee when the full-screen advertisement is operated based on the accesses.

CONCLUSION

As described above, according to the Web page with advertisement of an embodiment, it becomes possible to allow advertisers to submit advertisements with greater sizes. In case of the advertisements with greater sizes, users can browse the advertisements without feeling difficulty in, for example, browsing the advertisements or performing tap operation on the advertisements. Therefore, it becomes possible to achieve high advertising effectiveness (for example, CTR).

As described above, according to an embodiment, it becomes possible to improve the flexibility in the size of an advertisement to be submitted and improve the advertising effectiveness even on a mobile Web page.

Although the invention has been described with respect to specific embodiments for a complete and clear disclosure, the appended claims are not to be thus limited but are to be construed as embodying all modifications and alternative constructions that may occur to one skilled in the art that fairly fail within the basic teaching herein set forth.

What is claimed is:

1. A digital content generation apparatus that generates digital content for display on a terminal device, the digital content generation apparatus comprising:
a processor programmed to:
generate control information for controlling a display of the terminal device;
generate an upper content page including a content area and a transparent window, the upper content page being scrollable on a screen of the terminal device to move the content area and the transparent window together;
generate a lower content page, the lower content page including content directed to a user of the terminal device and having a larger displayable area than an area of the transparent window;
transmit the control information, the upper content page, and the lower content page to the terminal device; and
cause the terminal device to superimpose the generated upper content page over the generated lower content page on the screen based on the control information, such that a location of the lower content page is fixed relative to the display screen and the location of the upper content page is scrollable relative to the display screen so as to display only a part of the content directed to the user on the lower content page through the transparent window on the upper content page;
wherein, another part of the content directed to the user on the lower content page that is not located within the transparent window becomes visible through the transparent window due to scrolling of the upper content page over the fixed lower content page.

2. The digital content generation apparatus according to claim 1, wherein an entire area of the content directed to the user on the lower content page is displayed when the user interacts with the transparent window.

3. A non-transitory computer-readable storage medium with an executable program stored thereon, wherein the program instructs a computer to perform:
generating control information for controlling a display of a terminal device;
generating an upper content page including a content area and a transparent window, the upper content page being scrollable on a screen of the terminal device to move the content area and the transparent window together;
generating a lower content page, the lower content page including content directed to a user of the terminal device and having a larger displayable area than an area of the transparent window;
transmitting the control information, the upper content page, and the lower content page to the terminal device; and
causing the terminal device to superimpose one of the generated upper content page over the generated lower content page on the screen based on the control information, such that a location of the lower content page is fixed relative to the display screen and the location of the upper content page is scrollable relative to the display screen so as to display only a part of the content directed to the user on the lower content page through the transparent window on the upper content page;
wherein, another part of the content directed to the user on the lower content page that is not located within the transparent window becomes visible through the transparent window due to scrolling of the upper content page over the fixed lower content page.

4. The non-transitory computer-readable storage medium according to claim 3, wherein the program instructs the computer to further perform transmitting a scroll position that indicates a position of the transparent window after scrolling the upper content page to a server connected to the terminal device.

5. The non-transitory computer-readable storage medium according to claim 4, wherein the program instructs the computer to further perform:

detecting a tap operation on the transparent window and another tap operation on the non-transitory computer-readable storage medium in a state where an entire area of the content directed to the user on the lower content page is displayed in response to the tap operation; and transmitting the other tap operation to the server.

6. A terminal device that displays an digital content on a display, the terminal device comprising:

a processor programmed to:

receive control information for controlling the display;

receive an upper content page including a content area and a transparent window, the upper content page being scrollable on a screen of the terminal device to move the content area and the transparent window together;

receive a lower content page, the lower g content page including content directed to a user of the terminal device and having a larger displayable area than an area of the transparent window;

superimpose the generated upper content page over the generated lower content page on the screen based on the control information, such that a location of the lower content page is fixed relative to the display screen and the location of the upper content page is scrollable relative to the display screen so as to display only a part of the content directed to the user on the lower content page through the transparent window on the upper content page; and scroll the upper content page over the fixed lower content page so that another part of the content directed to the user on the lower content page that is not located within the transparent window becomes visible through the transparent window.

7. The terminal device according to claim 6, wherein the processor is programmed to transmit a scroll position that indicates a position of the transparent window after scrolling the upper content page to a server connected to the terminal device.

8. The terminal device according to claim 7, wherein the processor is programmed to:

detect a tap operation on the transparent window and another tap operation on the transparent window in a state where an entire area of the content directed to the user on the lower content page is displayed in response to the tap operation; and transmit the other tap operation to the server.

\* \* \* \* \*